UNITED STATES PATENT OFFICE 2,547,307

YELLOW DIFFUSION-FAST COLOR FORMERS OF THE BENZIMIDAZOLE CLASS

Winfred C. Craig, Westfield, N. J., assignor to General Aniline & Film Corporation, New York, N. Y., a corporation of Delaware No Drawing. Original application November 9, 1948, Serial No. 59,203. Divided and this application February 11, 1950, Serial No. 143,833

4 Claims. (Cl. 260—309)

The present invention relates to non-diffusing color forming components of the 2-phenyl benzimidazole class, having improved solubility characteristics and capable of yielding upon color-forming development yellow dyestuff images of enhanced spectral characteristics and exceedingly fine grain.

In the present day practical application of color photography, the method most generally used involves the employment of a monopack having differently sensitized superimposed silver halide emulsion layers, each containing a dyestuff component fast to diffusion in the emulsion and which upon development of the exposed monopack with a primary aromatic amino developer yields subtractively colored dyestuff images, i. e., cyan, magenta and yellow.

The yellow component generally employed is an open chain keto methylene compound such as acetoacetanilide, benzoylacetoacetanilide, and the like. For most purposes the dye images produced by such components are satisfactory although they leave something to be desired so far as spectral characteristics and grain are concerned. Another disadvantage in the utilization of such components is their low solubility, and particularly their low solution stability.

I have now found that the disadvantages which manifest themselves in the utilization of the generally employed yellow color formers can be overcome with the production of dyestuff images of enhanced spectral characteristics and fine grain by employing for the formation of the yellow image in the color forming development method a 2-phenyl benzimidazole containing a water solubilizing group in the fused-on benzene ring, a radical imparting fastness to diffusion on the nitrogen atom in the 1-position of the heterocyclic ring, and an acetamido radical in the phenyl ring attached to the carbon atom in 2-position. These color formers yield very desirable azomethine dye images by color forming development with developers of the p-phenylenediamine type, and in addition have very improved solubility characteristics when compared to the keto methylene compounds generally employed in the color development process.

These compounds as is evident from their structure have general utility as intermediates in the manufacture of azo dyes. Such compounds and their preparation constitute the purposes and objects of my invention.

The compounds contemplated herein may be depicted by the following structural formula:

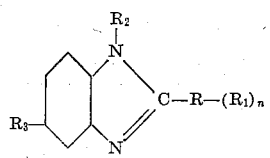

wherein R is a phenyl radical, a carbon atom of which is directly linked to the carbon atom of the heterocyclic ring, i. e., phenyl; halogen phenyl, i. e., chlorophenyl, bromophenyl and the like; alkyl phenyl, i. e., toluyl, ethylphenyl and the like; alkoxyphenyl, i. e., methoxyphenyl, ethoxyphenyl and the like, $R_1$ is the radical

—NH.CO.CH$_2$.A, $R_2$ is an alkyl chain containing at least 10 carbon atoms, i. e., decyl, undecyl, dodecyl, myristyl, tetradecyl, pentadecyl, octadecyl and the like; $R_3$ is a water solubilizing group such as sulfo, carboxy and the like, A is an alkyloyl radical, i. e., acetyl, propionyl, butyryl, and the like, aroyl, i. e., benzoyl, naphthoyl, and the like, cyano or carbethoxy; and $n$ is 1 or 2.

Examples of compounds embraced by the above formula are the following:

(1) 2-(4' - benzoylacetaminophenyl) - 1 - octadecylbenzimidazole-5-sulfonic acid.

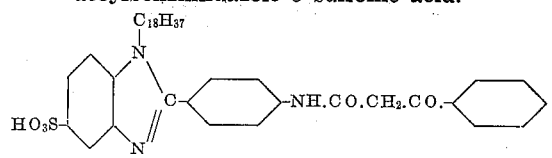

(2) 2-(4'-benzoylacetaminophenyl) - 1 - laurylbenzimidazole-5-sulfonic acid.
(3) 2-(4'-benzoylacetaminophenyl) - 1 - myristylbenzimidazole-5-sulfonic acid.
(4) 2-(3' - benzoylacetaminophenyl) - 1 - octadecylbenzimidazole-5-sulfonic acid.

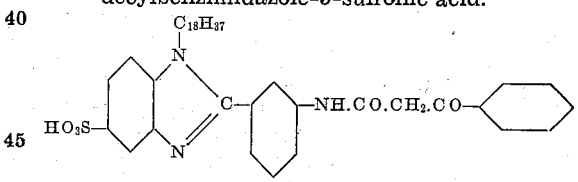

(5) 2-[(3'.5' - dibenzoylacetamino)phenyl] - 1 - octadecylbenzimidazole-5-sulfonic acid.

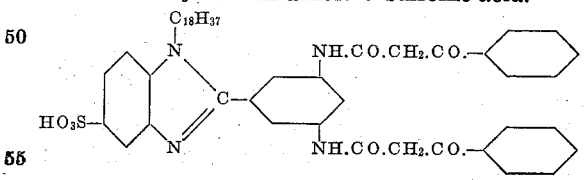

(6) 2 - [(3' - benzoylacetamino - 4' - chloro)-phenyl] - 1 - octadecylbenzimidazole - 5-sulfonic acid.

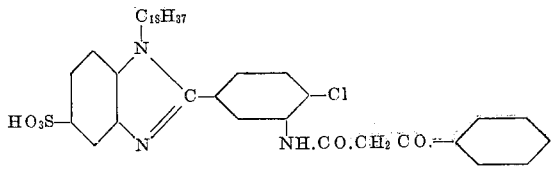

(7) 2 - [(3' - benzoylacetamino - 4' - methoxy)phenyl] - 1 - octadecylbenzimidazole - 5-sulfonic acid.

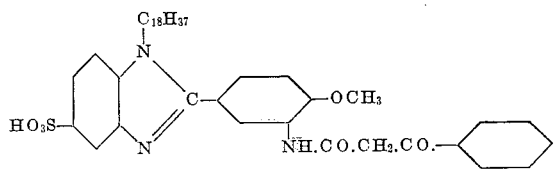

(8) 2 - [3' - benzoylacetamino - 4' - methoxy)-phenyl] - 1 - decyl benzimidazole - 5 - sulfonic acid.

(9) 2 - (4' - acetoacetaminophenyl) - 1 - octadecylbenzimidazole-5-sulfonic acid.

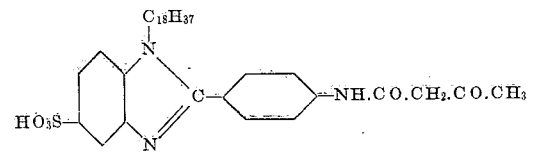

(10) 2 - (4' - acetoacetaminophenyl) - 1 - octadecylbenzimidazole-5-carboxylic acid.

(11) 2 - (4' - carbethoxyacetaminophenyl)-1-octadecylbenzimidazole-5-sulfonic acid.

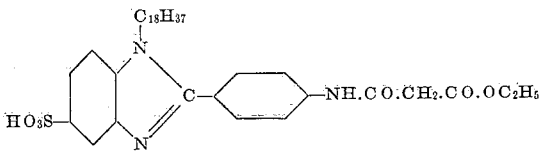

(12) 2-(4'-cyanoacetaminophenyl)-1-octadecylbenzimidazole-5-sulfonic acid.

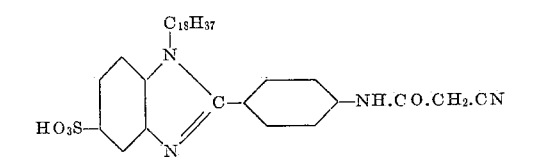

The compounds are prepared by heating a 2-(4'-aminophenyl)-1-long chain alkyl benzimidazole-5-sulfonic or carboxylic acid with an acyl acetic ester while mixing or by heating the aforesaid components in the presence of pyridine to a temperature of about 100-130° C.

The parent benzimidazole, on the other hand, is prepared by heating a 3-amino-4-long alkyl chain aminobenzene sulfonic or carboxylic acid with the desired nitro benzene carboxylic acid chloride in the presence of pyridine or any other suitable acid binding agent, the nitro compound then being reduced to the corresponding amine. Preparation of the intermediate is analogous to the method described in my copending application Ser. No. 745,113, filed April 30, 1947, now U. S. Patent 2,530,349, with the exception that the 1-hydroxy-2-naphthoyl chloride is replaced by the desired nitro benzoyl chloride, the resulting product then being reduced to the corresponding amine.

Emulsions designed for yielding the desired yellow image are prepared by dispersing a small quantity of the color former, i. e., about .5 gram of the color former in 100 cc. of a photographic silver halide emulsion, coating the emulsion on a support and drying the same. The film containing the emulsion may be processed by the negative-positive method or by the reversal method while utilizing for color development a primary aromatic amino developer such as p-diethylamino-aniline and the like.

The invention is further illustrated by the following examples, but it is to be understood that the invention is not restricted thereto.

*Example 1*

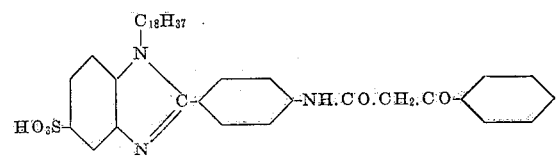

30 parts of 2-(4'-aminophenyl)-1-octadecylbenzimidazole-5-sulfonic acid and 15 parts of benzoylacetic ester are mixed in a Werner-Pfleiderer and heated for 4 hours at 50 lbs. steam pressure.

The crude product is purified by taking up in 125 parts of methanol and heating at reflux (65° C.) for ½ hour. After cooling to 30-35° C., the product is collected on a filter, washed with 50 parts of methanol, sucked dry, then air dried.

.5 gram of the purified product is dispersed in 100 cc. of a photographic silver bromide emulsion. The emulsion is coated on a transparent support and dried. After exposure the film is developed in a color forming developer comprising an aqueous solution of 10 parts of sodium sulfite, 15 parts of p-diethylamino aniline, 2.5 parts of sodium carbonate, and 70 parts of potassium bromide. The silver and dye image is thus formed. After removal of the silver by bleaching in potassium ferrocyanide solution and subsequent fixing, a bright yellow dyestuff image of very fine grain is obtained.

*Example 2*

30 parts of 2-(4'-aminophenyl)-1-octadecylbenzimidazole-5-sulfonic acid, 15 parts of benzoylacetic ester, and 200 parts of pyridine are heated at 110-120° C. for 4 hours. The reaction mixture is diluted with 100 parts of water, and then drowned in a mixture of 200 parts of concentrated hydrochloric acid, and 1000 parts of ice-water. The crude product is collected on a filter, washed twice with cold water, sucked dry as possible, and air dried.

The crude product is purified by taking up in 200 parts of methanol and heating at reflux (65° C.) for ½ hour. After cooling to 20-25° C., the product is collected on a filter, washed with 75 parts of methanol, sucked dry, then air dried. The product is the same as that of Example 1 and may be used as there indicated.

*Example 3*

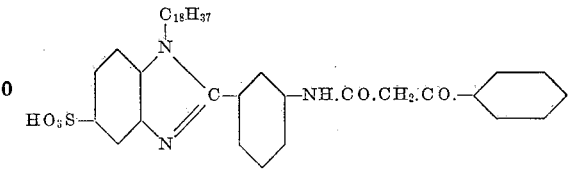

This product is prepared in the same manner as Example 1 from 30 parts of 2-(3'-aminophenyl) - 1 - octadecylbenzimidazole - 5 - sulfonic acid, and 15 parts of benzoylacetic ester.

An intense yellow dye image of very fine grain is obtained by dispersing the color former in a photographic silver bromide emulsion and processing the emulsion as in Example 1.

*Example 4*

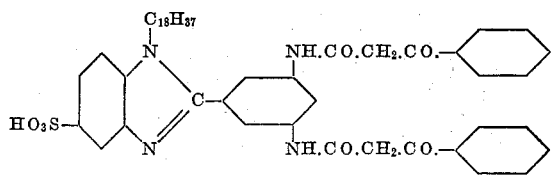

This product is prepared in the manner of Example 1 from 28 parts of 2-(3′, 5′-diaminophenyl) - 1 - octadecylbenzimidazole - 5 - sulfonic acid, and 25 parts of benzoylacetic ester.

Dye images similar to those obtained in Examples 1 and 3 result when utilizing the above color former for the production of an azomethine dye image.

*Example 5*

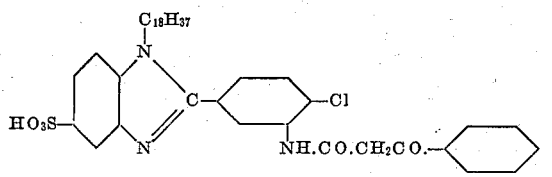

This product is prepared in the same manner as Example 1 from 30 parts of 2-[(3′-amino-4′-chloro) phenyl] - 1 - octadecylbenzimidazole - 5 - sulfonic acid, and 15 parts of benzoylacetic ester.

A bright yellow azomethine dye image is produced by utilizing the above color former as in Example 1. Such dye images are characterized particularly by the fineness of their grain.

*Example 6*

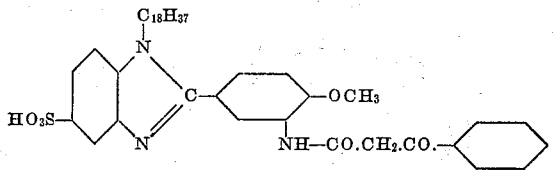

This product is prepared in the manner of Example 1 from 32 parts of 2-[(3′-amino-4′-methoxy) phenyl] - 1 - octadecylbenzimidazole - 5-sulfonic acid, and 18 parts of benzoylacetic ester.

A bright yellow azomethine dye image is produced by utilizing the above color former as in Example 1. Such dye images are characterized particularly by the fineness of their grain.

*Example 7*

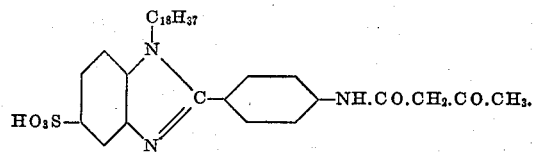

This product is prepared in a manner similar to Example 1 from 27 parts of 2-(4′-aminophenyl) - 1 - octadecylbenzimidazole - 5 - sulfonic acid, and 15 parts of acetoacetic ester.

A bright yellow azomethine dye image is produced by utilizing the above color former as in Example 1. Such dye images are characterized particularly by the fineness of their grain.

*Example 8*

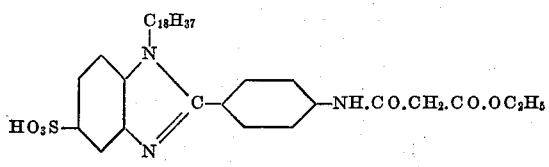

This product is prepared in a manner similar to Example 1 from 27 parts of 2-(4′-aminophenyl) - 1 - octadecylbenzimidazole - 5 - sulfonic acid, and 12 parts of diethyl malonate.

A bright yellow azomethine dye image is produced by utilizing the above color former as in Example 1. Such dye images are characterized particularly by the fineness of their grain.

*Example 9*

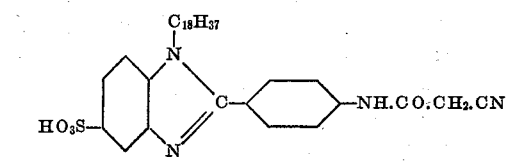

37 parts of 2-(4′-aminophenyl) - 1 - octadecylbenzimidazole-5-sulfonic acid and 50 parts of cyanocetic ester are heated at 145-150° C. for 4 hours. To the cooled reaction mixture there is added 75 parts of methanol, and 75 parts of ethyl acetate. The product is collected on a filter, washed with 75 parts of ethyl acetate, sucked dry, and then air dried.

A bright yellow azomethine dye image is produced by utilizing the above color former as in Example 1. Such dye images are characterized particularly by the fineness of their grain.

The present application is a division of my co-pending application Serial No. 59,203, filed November 9, 1948, now U. S. Patent 2,500,487.

Various modifications of the invention will occur to persons skilled in this art, and I therefore do not intend to be limited in the patent granted except as necessitated by the appended claims.

I claim:

1. Compounds of the following formula:

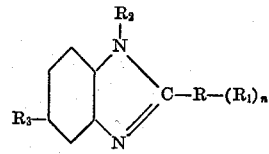

wherein R is a phenyl radical, $R_1$ is the grouping —NH.CO.CH$_2$.A, $R_2$ is an alkyl radical containing at least 10 carbon atoms, $R_3$ is a water solubilizing group, $n$ is selected from the class consisting of 1 and 2, and A is a member of the class consisting of alkyloyl, aroyl, cyano and carbethoxy.

2. The compound 2 - (4′ - benzoylacetamino phenyl) - 1-octadecyl benzimidazole - 5 - sulfonic acid.

3. The compound 2 - (3′ - benzoylacetamino phenyl) - 1 - octadecyl benzimidazole - 5 - sulfonic acid.

4. The compound 2-[(3′.5′-di-benzoylacetamino)phenyl]-1-octadecyl benzimidazole-5-sulfonic acid.

WINFRED C. CRAIG.

No references cited.